(12) United States Patent
Buchholz

(10) Patent No.: US 10,773,792 B2
(45) Date of Patent: Sep. 15, 2020

(54) AIR FLOW CHANNELING YAW CONTROL DEVICE

(71) Applicant: Lockheed Martin Aeronautics Company, Bethesda, MD (US)

(72) Inventor: Mark D. Buchholz, Leona Valley, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 254 days.

(21) Appl. No.: 15/910,540

(22) Filed: Mar. 2, 2018

(65) Prior Publication Data

US 2019/0270510 A1 Sep. 5, 2019

(51) Int. Cl.
*B64C 9/34* (2006.01)
*B64C 3/14* (2006.01)

(52) U.S. Cl.
CPC .......... *B64C 9/34* (2013.01); *B64C 2003/145* (2013.01)

(58) Field of Classification Search
CPC .... B64C 5/10; B64C 5/12; B64C 9/34; B64C 9/36; B64C 21/00; B64C 23/00; B64C 23/06; B64C 2230/26; B63B 1/30; B63B 1/322; E02B 8/02; E02B 8/023; E02B 8/085; F15D 1/10; F15D 1/12
See application file for complete search history.

(56) References Cited

U.S. PATENT DOCUMENTS

| 1,314,027 A | 8/1919 | Stewart |
| 1,545,808 A | 7/1925 | Ajello |
| 1,749,021 A | 3/1930 | Davis |
| 1,777,279 A | * 10/1930 | Anderson ............... B64C 23/00 244/210 |
| 2,559,823 A | * 7/1951 | Klose ........................ B64C 5/10 244/87 |
| 2,768,801 A | * 10/1956 | Rauth ....................... B64C 9/34 244/90 A |
| 2,821,352 A | 1/1958 | Phillips |
| 2,868,407 A | * 1/1959 | Woodcock ........... B65D 88/524 220/7 |
| 3,144,220 A | * 8/1964 | Kittelson ................ B64C 23/00 244/203 |
| 3,469,807 A | * 9/1969 | Morris, Jr. ................ B64C 5/08 244/90 R |
| 3,559,222 A | * 2/1971 | Walker ...................... B63B 1/22 114/357 |
| 3,763,811 A | * 10/1973 | Danahy ..................... B63B 1/30 114/279 |

(Continued)

*Primary Examiner* — Joseph W Sanderson
(74) *Attorney, Agent, or Firm* — Baker Botts L.L.P.

(57) ABSTRACT

An air flow channeling yaw control device includes a vane cover, a vane array, and an actuator. The vane array includes a plurality of vanes, each of the plurality of vanes comprising a first edge and a second edge, the first edge being hingedly coupled to the vane cover and the second edge being hingedly coupled to a wing of an aircraft. The wing includes a leading edge and a trailing edge. The actuator is configured to move the plurality of vanes from a retracted position into a deployed position. The plurality of vanes, when moved into the deployed position, are configured to direct a flow of air flowing over the leading edge of the wing through channels created by the plurality of vanes. The plurality of vanes, when moved into the retracted position, are configured to retract within the wing.

20 Claims, 5 Drawing Sheets

(56) References Cited

U.S. PATENT DOCUMENTS

| | | | | |
|---|---|---|---|---|
| 3,879,941 A * | 4/1975 | Sargisson | ............... | B64D 33/02 60/226.3 |
| 3,946,459 A * | 3/1976 | Armstrong | .............. | B08B 9/049 15/377 |
| 3,950,804 A * | 4/1976 | Brumfield | ............... | B63B 7/082 441/40 |
| 4,117,995 A * | 10/1978 | Runge | ..................... | B64C 9/146 244/130 |
| 4,351,262 A * | 9/1982 | Matthews | ................. | B63B 1/14 114/284 |
| 4,466,586 A | 8/1984 | Burnham | | |
| 5,598,990 A | 2/1997 | Farokhi et al. | | |
| 5,772,155 A | 6/1998 | Nowak | | |
| 7,954,769 B2 * | 6/2011 | Bushnell | ................... | B64C 9/02 244/204 |
| 7,997,538 B2 * | 8/2011 | Osborne | ................... | B64C 9/32 244/199.4 |
| 9,310,166 B2 | 4/2016 | Prince et al. | | |
| 9,638,176 B2 | 5/2017 | Shivashankara et al. | | |
| 9,938,002 B2 * | 4/2018 | Fujimoto | ................. | B64C 5/02 |
| 2011/0042518 A1 * | 2/2011 | Da Silva | ................ | B64C 23/06 244/130 |
| 2013/0119193 A1 * | 5/2013 | Gall | ......................... | B64C 5/06 244/87 |
| 2015/0191243 A1 * | 7/2015 | Fujimoto | ................. | B64C 5/02 244/7 R |
| 2016/0121996 A1 * | 5/2016 | Eveker | ................. | B64C 23/005 244/130 |

* cited by examiner

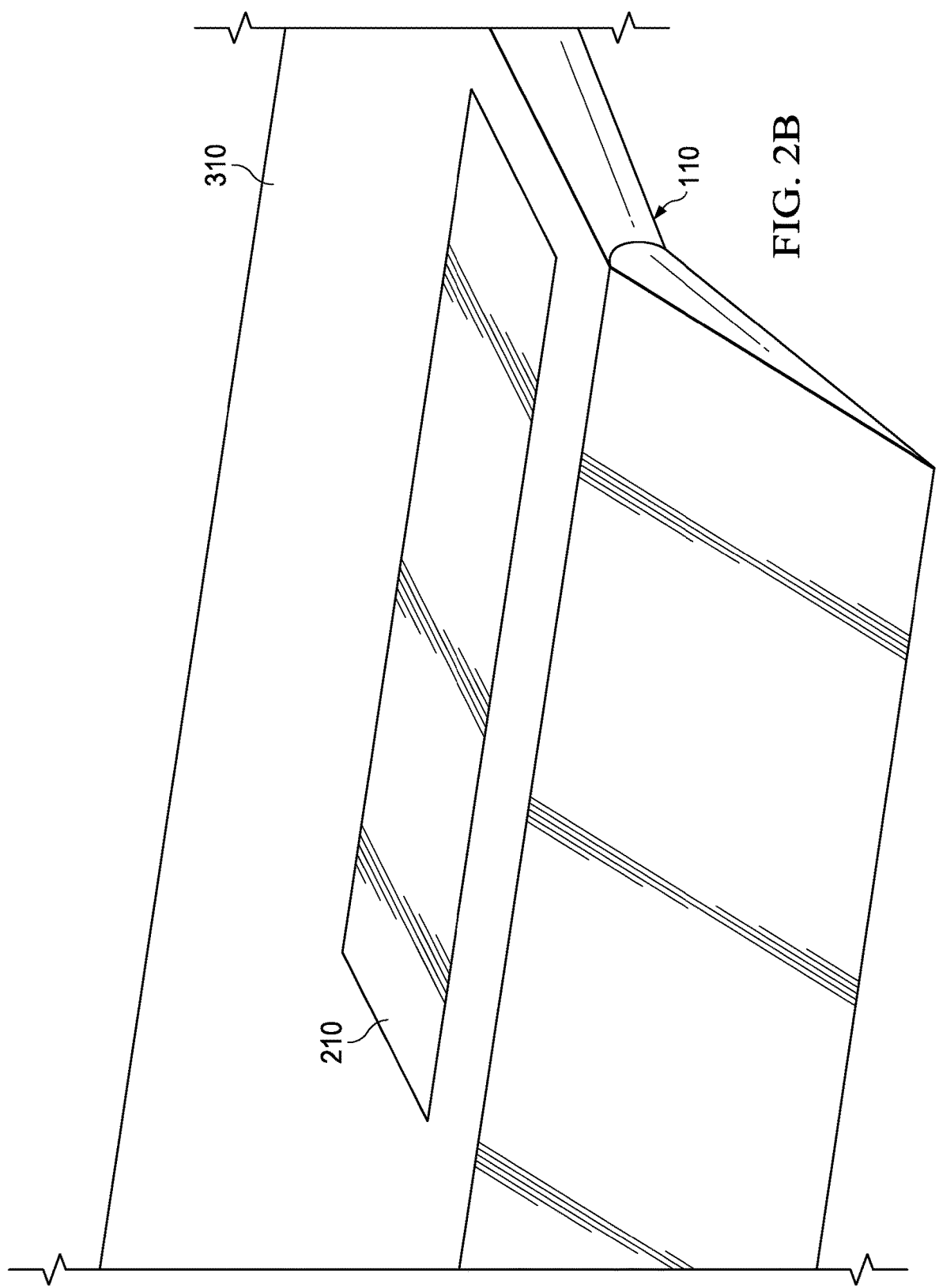

US 10,773,792 B2

AIR FLOW CHANNELING YAW CONTROL DEVICE

TECHNICAL FIELD

This disclosure relates in general to channeling air flow and more particularly to an air flow channeling yaw control device for a wing of an aircraft.

BACKGROUND

The principle axes for an aircraft in flight are yaw, pitch, and roll. Generally, yaw refers to torque about a yaw (vertical) axis, pitch refers to torque about a pitch (lateral) axis, and roll refers to torque about a roll (longitudinal) axis. Any force can cause an aircraft to rotate about any of these axes. For example, a wind gust striking a tail of an aircraft may cause the aircraft to rotate about the yaw axis. Rotation about the yaw axis is commonly referred to as a "yawing moment." In some circumstances, aircraft employ various solutions to control rotation about the principle axes.

One such solution is a blade spoiler to be mounted to a wing. The blade spoiler is configured to spoil a flow of air, generating a drag force at a moment arm to rotate about the yaw axis. In other words, aircraft employ blade spoilers in order to provide yaw moment control power. Although blade spoilers may provide control over the yaw moment, blade spoilers reduce the ability of an aircraft to generate pitching moment and rolling moment control power since the spoiler deflects the flow of air away from a trailing edge control surface of a wing.

SUMMARY OF THE DISCLOSURE

According to one embodiment, an air flow channeling yaw control device includes a vane cover, a vane array, and an actuator. The vane array includes a plurality of vanes, each of the plurality of vanes comprising a first edge and a second edge, the first edge being hingedly coupled to the vane cover and the second edge being hingedly coupled to a wing of an aircraft. The wing includes a leading edge and a trailing edge. The actuator is configured to move the plurality of vanes from a retracted position into a deployed position. The plurality of vanes, when moved into the deployed position, are configured to direct a flow of air flowing over the leading edge of the wing through channels created by the plurality of vanes. The plurality of vanes, when moved into the retracted position, are configured to retract within the wing.

Technical advantages of certain embodiments may include providing the ability for an aircraft to generate yawing moment control power. Certain other embodiments may provide an aircraft the ability to generate pitching moment control power and/or rolling moment control power. Additionally, some embodiments may provide a retractable air flow channeling yaw control device configured to deploy only when necessary or desirable. Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which:

FIG. 2B illustrates the air flow channeling yaw control device of FIG. 1 in a retracted position, according to embodiments of the present disclosure.

DETAILED DESCRIPTION OF THE DISCLOSURE

To facilitate a better understanding of the present disclosure, the following examples of certain embodiments are given. The following examples are not to be read to limit or define the scope of the disclosure. Embodiments of the present disclosure and its advantages are best understood by referring to FIGS. 1 through 5, where like numbers are used to indicate like and corresponding parts.

Aircraft, including unmanned aerial vehicles ("UAV"s), commonly employ various solutions to control rotation about one or more of the yaw, pitch, and roll axes. A conventional solution to controlling torque about the yaw axis is the employment of blade spoilers on aircraft. Generally, blade spoilers "spoil" air flow, creating drag at a moment arm to would otherwise cause an aircraft to rotate about the yaw axis. Although blade spoilers may be effective at generating yaw moment control power, they reduce the ability of an aircraft to generate pitching moment control power and/or rolling moment control power. This is because the same air flow that would cause a yawing moment is now spoiled and less effective for use by the aircraft to generate pitching moment control power and/or rolling moment control power. Accordingly, there is a need for a solution that permits an aircraft to generate yawing moment control power without affecting and/or reducing the aircraft's ability to generate pitching moment control power and/or rolling moment control power.

The teachings of the disclosure recognize that these and other problems of typical aircraft may be reduced or eliminated by using an air flow channeling yaw control device. The following describes an air flow channeling yaw control device for providing these and other desired features.

Figure 1:
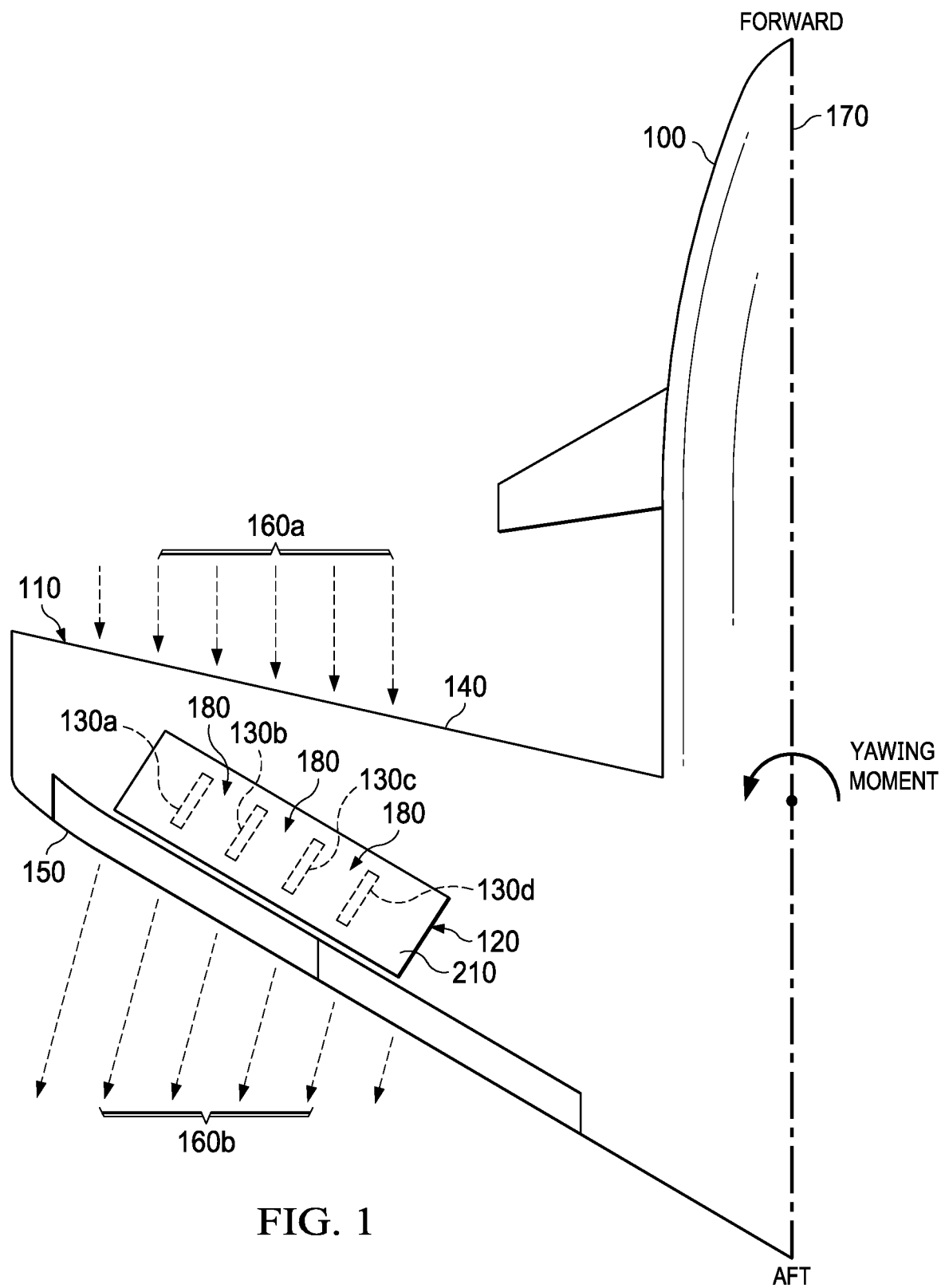
FIG. 1 illustrates a wing of an aircraft comprising an air flow channeling yaw control device, according to embodiments of the present disclosure.

FIG. 1 illustrates an example air flow channeling yaw control device 120 on a wing 110 of aircraft 100, according to certain embodiments of the present disclosure. As depicted, wing 110 includes a leading edge 140 and a trailing edge 150. As used herein, "leading edge" refers to a part of wing 110 that first contacts a flow of air (indicated by arrows 160) and "trailing edge" refers to a part of wing 110 that contacts the flow of air after leading edge 140. As shown in FIG. 1, air flows over leading edge 140 in a first direction 160a and is re-directed by air flow channeling yaw control device 120 such that the air flows over trailing edge 150 in a second direction 160b. This disclosure recognizes that utilizing air flow channeling yaw control device 120 may permit aircraft 100 to generate yawing moment control power as well as pitch moment control power and roll moment control power. As shown in FIG. 1, yawing moment refers to rotation of aircraft 100 about a yaw (vertical) axis 170.

Figure 2A:
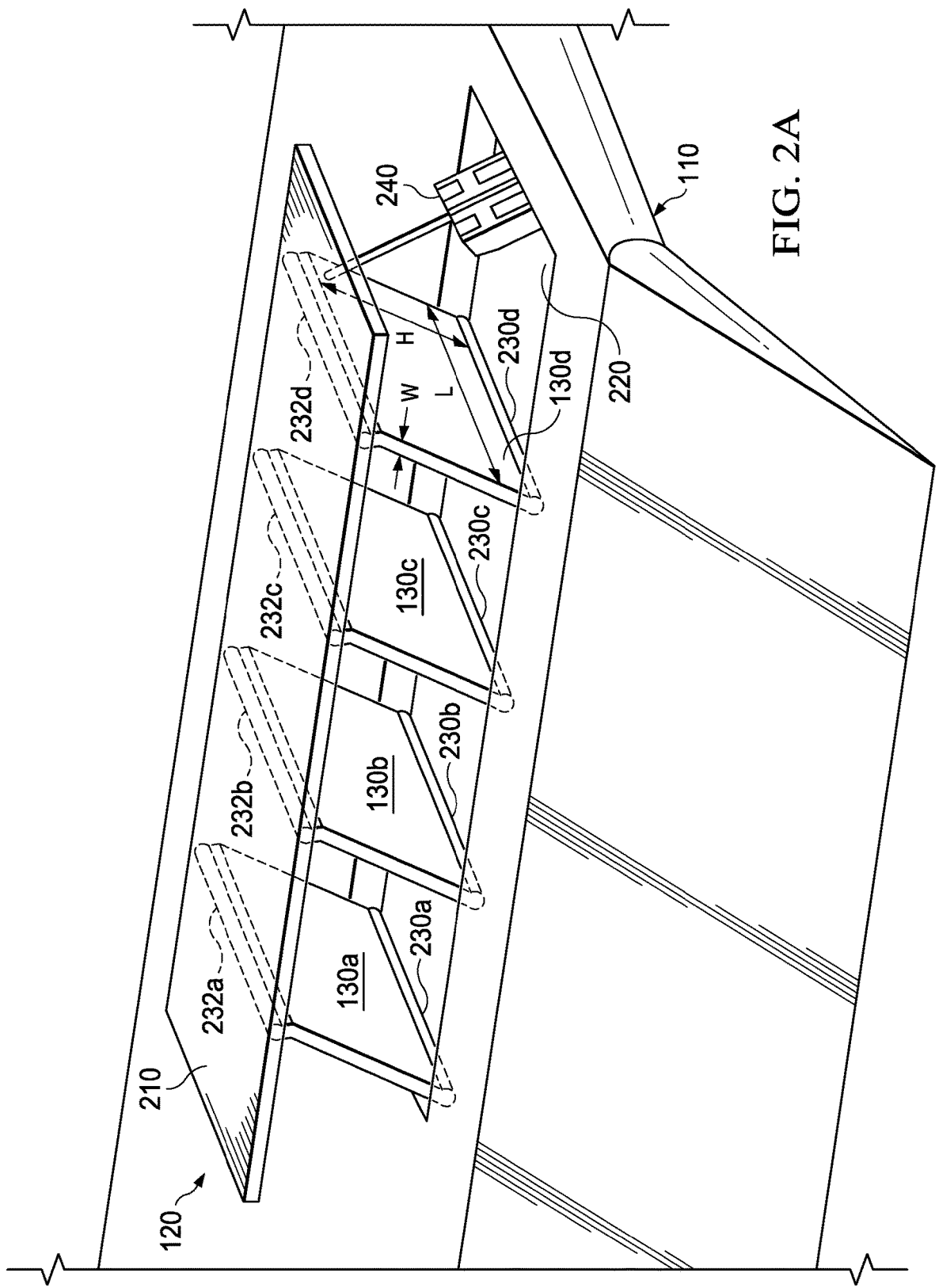
FIG. 2A illustrates the air flow channeling yaw control device of FIG. 1 in a deployed position, according to embodiments of the present disclosure.
Figure 3:
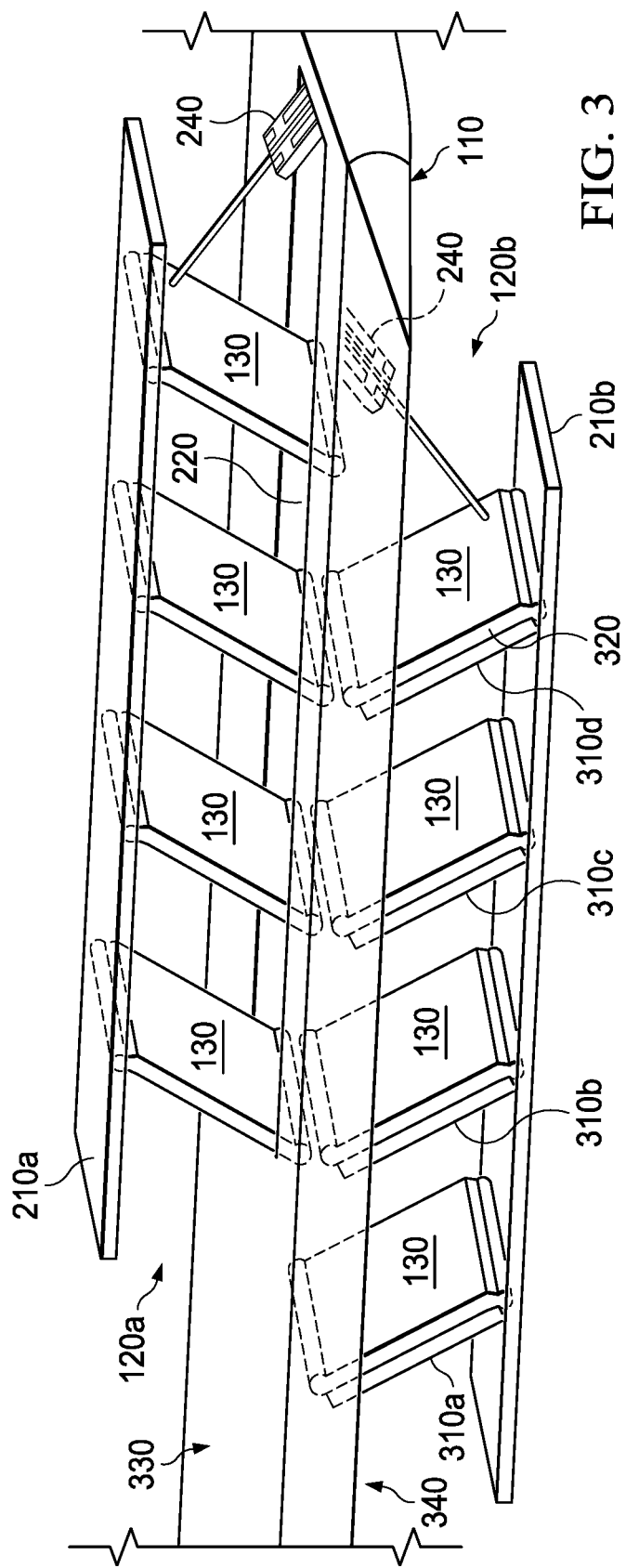
FIG. 3 illustrates a wing of an aircraft comprising two air flow channeling yaw control devices, one configured to deploy from a top surface of the wing and another configured to deploy from a bottom surface of the wing, according to certain embodiments of the present disclosure.

As will be described in further detail in reference to FIGS. 2A and 2B, air flow channeling yaw control device 120 includes a vane cover 210 and a plurality of vanes 130. As used herein, vanes 130 of air flow channeling yaw control device 120 are collectively referred to as a vane array. A vane array may include any suitable number of vanes 130. As depicted in FIGS. 1-3, each air flow channeling yaw control device 120 may include four vanes 130a-d. This disclosure recognizes that the number of vanes 130 required to generate yawing moment control power may be decreased if the height of vanes 130 are tall enough. For example, an air flow channeling yaw control device comprising three vanes each having a height of 16 inches may generate the same amount of yawing moment control power as an air flow channeling yaw control device comprising four vanes each having a height of 12 inches. As will be described below in more detail in reference to FIGS. 2A and 2B, vane cover 210 and vanes 130 may be any suitable size and shape. This disclosure recognizes that air flow channeling yaw control device 120 may move from a stowed (also referred to herein as "retracted") position (see e.g., FIG. 2B) to a deployed position (see e.g., FIG. 2A) and vice versa. As depicted in FIGS. 1 and 2A, vanes 130 are configured to support vane cover 210 when air flow channeling yaw control device 120 is in the deployed position. Yawing moment control power, pitching moment control power, and/or rolling moment control power may be generated when air flow channeling yaw control device 120 is in the deployed position. This is because air flow channeling yaw control device 120 redirects the flow of air (thereby creating a side force and a yawing moment) after traveling over leading edge 140 of wing 110 by creating channels 180 formed from the plurality of vanes 130. The redirected air then travels over trailing edge 150 of wing 110, thus allowing the trailing edge control surface to be effective at controlling rotation about the roll and pitch axes. In some embodiments, the plurality of vanes laterally turn the flow of air when in the deployed position.

In some embodiments, air flow channeling yaw control device 120 is configured to extend, when in the deployed position, from a top surface of wing 110. In other embodiments, air flow channeling yaw control device 120 is configured to extend, when in the deployed position, from a bottom surface of wing 110. In yet other embodiments, air flow channeling yaw control device 120 is configured to extend, when in the deployed position, from both a top surface and a bottom surface of wing 110 (see e.g., FIG. 3).

FIG. 2A illustrates air flow channeling yaw control device 120 in the deployed position. As depicted in FIG. 2A, air flow channeling yaw control device 120 includes vane cover 210 and a plurality of vanes 130a-d. In some embodiments, vanes 130 include one or more hinges. As depicted in FIG. 2A, each vane 130 includes hinges 230, 232. In some embodiments, vane cover 210 is coupled to vanes 130 by hinges 232. For example, as depicted in FIG. 2A, vane cover 210 is coupled to vane 130a by hinge 232a, coupled to vane 130b by hinge 232b, coupled to vane 130c by hinge 232c, and coupled to vane 130d by hinge 232d. Hinge 232 may be positioned on a first edge of vane 130 and hinge 230 may be positioned on a second edge of vane 130. Hinges 230 may couple vanes 130 to wing 110. For example, as depicted in FIG. 2A, vane 130a is coupled to wing 110 by hinge 230a, vane 130b is coupled to wing 110 by hinge 230b, vane 130c is coupled to wing 110 by hinge 230c, and vane 130d is coupled to wing 110 by hinge 230d. In some embodiments, hinge 230 is coupled to an inner surface of wing 110. For example, hinge 230 may be coupled to one or more inner walls of cavity 220. In other embodiments, hinge 230 is coupled to an outer surface of wing 110. Hinges 230 and 232 may permit the vane array (e.g., vanes 130a-d) to retract into a cavity (e.g., cavity 220) of wing 110.

A vane array may include vanes 130 all having the same dimensions (length×width×height). A vane array may also include vanes 130 having one or more different dimensions from one another. For example, vane 130a may have a length (indicated in FIG. 2A as "L") of 10 inches, a height (indicated in FIG. 2A as "H") of 12 inches, and a width (indicated in FIG. 2A as "W") of 1.5 inches, whereas vane 130b may have a length of 10 inches, a height of 12 inches, and a width of 1 inch.

In some embodiments, wing 110 includes a cavity (see e.g., cavity 220 of FIG. 2A) configured to accommodate air flow channeling yaw control device 120. In such embodiments, air flow channeling yaw control device 120 may be stowed in cavity 220 until air flow channeling yaw control device 120 is needed and/or desired. When air flow channeling yaw control device 120 is stowed, vane cover 210 may substantially cover cavity 220. As used herein, "substantially cover" means that the area (length×width) of vane cover 210 is at least 80% of the area of cavity 220. In some embodiments, the width of cavity 220 is substantially the same (at least 80%) as a total height of vanes 130 (height of vanes 130 is indicated in FIG. 2A as "H"). For example, if air flow channeling yaw control device 120 includes four vanes 130 and each vane has a height of 12 inches, the width of cavity 220 may range from 38.4 inches to 57.6 inches. Although this disclosure describes a +/−20% variance in the width of vane cover 210, this disclosure recognizes certain benefits of having vane cover 210 be the same as the width of cavity 220. For example, wing 110 of aircraft 100 may be complanate when vane cover 210 is the same size (+/−2%) as cavity 220. Stated differently, vane cover 210 may be substantially flush with an exterior surface of wing 310 when in the stowed position. In such case, aircraft 100 has a clean field and has aerodynamic surfaces when air flow channeling yaw control device 120 is stowed (see e.g., FIG. 2B). This disclosure also recognizes certain benefits to not employing an oversized vane cover 210. For example, a larger vane cover 210 may be associated with increased weight, which in some cases is disadvantageous.

In some embodiments, the depth of cavity 220 may be associated with the width of vanes 130. For example, cavity 220 may have a depth greater than or equal to the width of the widest vane 130. For example, if the widest vane 130 had a width of 2 inches, cavity 220 may have a depth of at least 2 inches.

Figure 4:
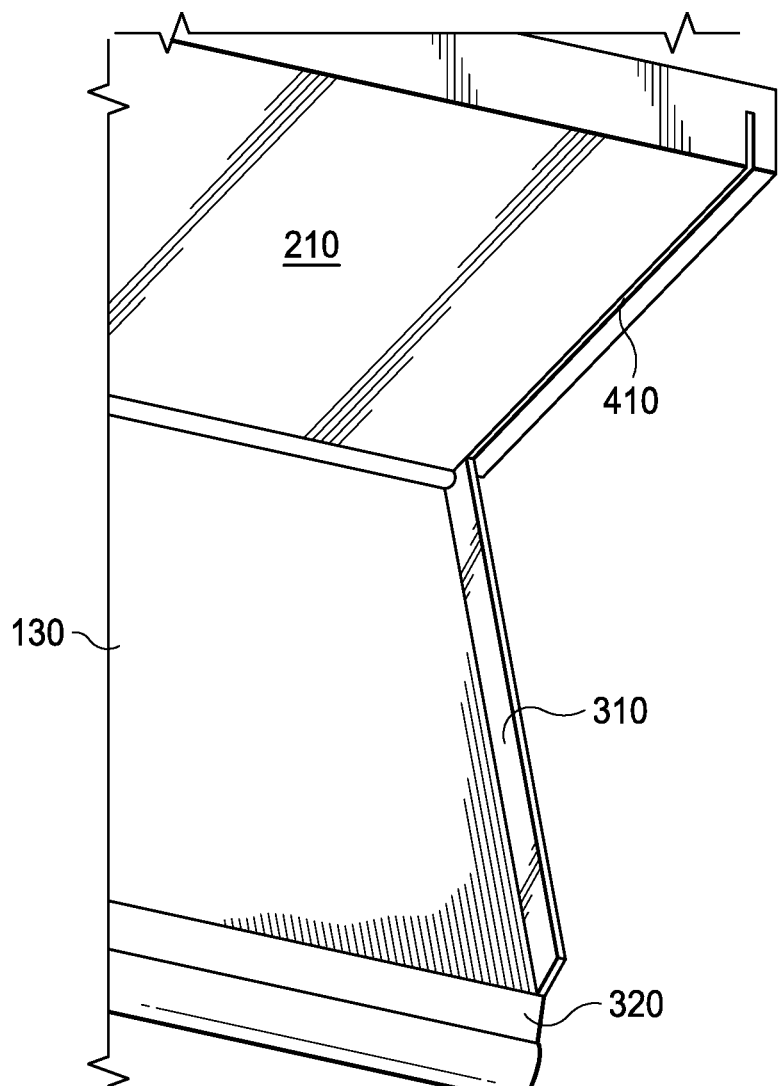
FIG. 4 illustrates a vane cover and a vane of the air flow channeling yaw control device of FIG. 1, according to certain embodiments of the present disclosure.

Air flow channeling yaw control device 120 may also include at least one actuator 240. As depicted in FIG. 2A, aircraft 100 includes one air flow channeling yaw control device 120 having actuator 240. As depicted in FIG. 4, aircraft 100 includes two air flow channeling yaw control devices 120, each including an actuator 240. Actuator 240 may be configured to move the vane array from a retracted position to a deployed position (or vice versa). In some embodiments, actuator 240 is positioned nearest to the most inboard vane 130 of air flow channeling yaw control device 120. In other embodiments, actuator 240 is positioned nearest to the most outboard vane 130 of air flow channeling yaw control device 120. As used herein, "inboard" is used to refer to a position nearest a fuselage of aircraft 100 and "outboard" is used to refer to a position away from a fuselage of aircraft 100.

As depicted in FIG. 2A, a first end of actuator 240 is coupled to cavity 220 of wing 110 and a second end of actuator 240 is coupled to vane cover 210. Although depicted in this arrangement, this disclosure also recognizes that the second end of actuator 240 could instead be coupled to vane 130. Moving either vane cover 210 and/or vane 130 into the deployed position may cause an entire vane array to move into the deployed position. In some embodiments, actuator 240 secures air flow channeling yaw control device 120 in the deployed position until it is necessary and/or desirable to stow air flow channeling yaw control device 120. For example, actuator 240 may be sturdy enough to hold vane array in the deployed position when aircraft 100 is in flight.

In some embodiments, actuator 240 is communicably coupled to a controller (e.g., flight control computer) such as computer 500 of FIG. 4. Actuator 240 may be operable to move vanes 130 from a first position (e.g., stowed position) to a second position (e.g., deployed position) upon receiving instructions from the controller. For example, in response to determining that yaw control is needed, controller may send instructions to actuator 240 to deploy air channeling device 120. This disclosure recognizes that such controller may be onboard or offboard aircraft 100.

In some embodiments, actuator 240 may receive instructions to move one or more vane arrays into the deployed and/or retracted position. For example, if aircraft 100 includes four air flow channeling yaw control devices 120 (e.g., on top and bottom surfaces of a left wing 110a (not depicted) and a right wing 110b (not depicted)), actuator 240 may receive instructions to deploy vane arrays of left wing 110a. As another example, actuator 240 may receive instructions to deploy the vane arrays on the top surfaces of wings 110a-b or the vane arrays on the bottom surfaces of wings 110a-b. As yet another example, actuator 240 may receive instructions to deploy a vane array of left wing 110a and a vane array of right wing 110b. Although not depicted, this disclosure recognizes that vane arrays of each air flow channeling yaw control device 120 may include a different number of vanes 130. For example, an air flow channeling yaw control device positioned to deploy from a top surface of wing 110 may include four vanes 130 whereas an air flow channeling yaw control device positioned to deploy from a bottom surface of wing 110 may include two vanes 130.

FIG. 3 illustrates an example of wing 110 having two air flow channeling yaw control devices 120a-b. As depicted, air flow channeling yaw control device 120a is configured to deploy from a top surface 330 of wing 110 and air flow channeling yaw control device 120b is configured to deploy from a bottom surface 340 of wing 110. In some embodiments, vanes 130 may include gurney flaps 310. As depicted in FIG. 3, gurney flaps 310 may be coupled to each vane 130 of air flow channeling yaw control device 120b. In other embodiments, gurney flaps 310 are coupled to at least one vane 130 of air flow channeling yaw control device 120. As also depicted in FIG. 2, air flow channeling yaw control device 120 may not include gurney flaps 310 (see e.g., air flow channeling yaw control device 120a).

Gurney flaps 310 may be positioned at a substantially perpendicular angle (e.g., 90°+/−5) from vane 130. Gurney flaps 310 may extend from a trailing edge 320 of vanes 130 (see e.g., FIGS. 3 and 4). As depicted in FIG. 3, gurney flaps 310 are positioned on a windward face of trailing edge 310 of vanes 130. In some embodiments, gurney flaps 310 extend the entire height of trailing edge 320. In other embodiments, gurney flaps 310 extend only a portion of the height of trailing edge 320. This disclosure recognizes certain benefits of air flow channeling yaw control devices 120 including gurney flaps 310. For example, gurney flaps 310 may increase the side force on vanes 130 which in turn increases yawing moment control power.

Turning now to FIG. 4, an example of vane cover 210 of air flow channeling yaw control device 120 is provided. As depicted, vane cover 210 may include a slot 410 configured to accommodate gurney flap 310. This disclosure recognizes that slot 410 may accommodate gurney flap 310 when air flow channeling yaw control device 120 is in the stowed position. Although not depicted, this disclosure recognizes that vane cover 210 may include any suitable number of slots 410 to accommodate one or more gurney flaps 310 of vanes 130.

The components described herein may be made from any suitable material. For example, vane cover 210, vanes 130, and gurney flaps 310 may be constructed from aerodynamic materials such as carbon fiber, carbon nanotube, cellulose nanocrystals, kevlar, plastic, metal, and/or any combination of these materials. Preferably, components of air flow channeling yaw control device 120 are made from materials that are sturdy and lightweight.

Figure 5:
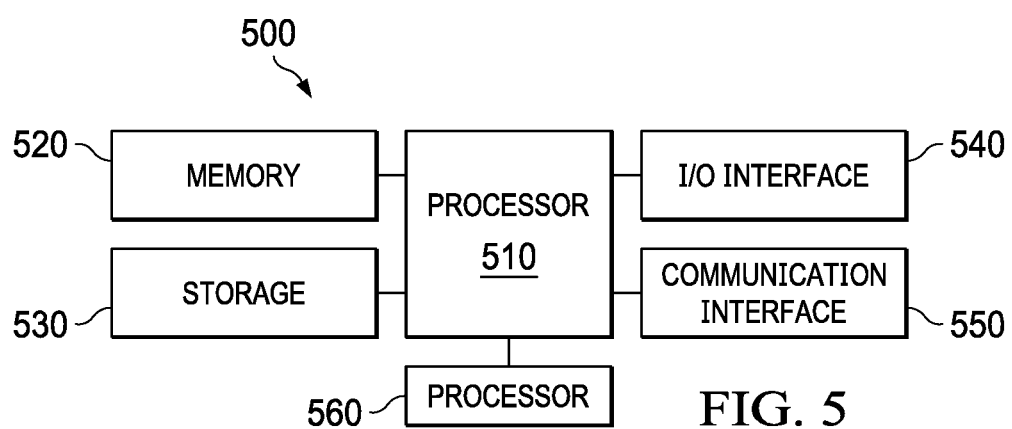
FIG. 5 illustrates an example computer system that may be included in a controller configured to cause air flow channeling yaw control device to deploy and/or retract, according to embodiments of the present disclosure.

FIG. 5 illustrates an example of a computer system 500. As described above, actuator 240 may receive instructions from a controller such as computer system 500. Computer system 500 may be any suitable computing system in any suitable physical form. As example and not by way of limitation, computer system 500 may be a virtual machine (VM), an embedded computer system, a system-on-chip (SOC), a single-board computer system (SBC) (e.g., a computer-on-module (COM) or system-on-module (SOM)), a desktop computer system, a laptop or notebook computer system, a mainframe, a mesh of computer systems, a server, an application server, or a combination of two or more of these. Where appropriate, computer system 500 may include one or more computer systems 500; be unitary or distributed; span multiple locations; span multiple machines; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate. Some or all of the steps of the methods described herein may be performed automatically.

In particular embodiments, one or more computer systems 500 provide functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As an example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

Computer system 500 may include a processor 510, memory 520, storage 530, an input/output (I/O) interface 540, a communication interface 550, and a bus 560 in some embodiments, such as depicted in FIG. 1B. Although this disclosure describes and illustrates a particular computer system having a particular number of particular components in a particular arrangement, this disclosure contemplates any suitable computer system having any suitable number of any suitable components in any suitable arrangement.

Processor 510 includes hardware for executing instructions, such as those making up a computer program, in particular embodiments. As an example and not by way of limitation, to execute instructions, processor 510 may retrieve (or fetch) the instructions from an internal register, an internal cache, memory 520, or storage 530; decode and execute them; and then write one or more results to an internal register, an internal cache, memory 520, or storage 530. In particular embodiments, processor 510 may include one or more internal caches for data, instructions, or addresses. This disclosure contemplates processor 510 including any suitable number of any suitable internal caches, where appropriate. As an example and not by way of limitation, processor 510 may include one or more instruction caches, one or more data caches, and one or more translation lookaside buffers (TLBs). Instructions in the instruction caches may be copies of instructions in memory 520 or storage 530, and the instruction caches may speed up retrieval of those instructions by processor 510. Data in the data caches may be copies of data in memory 520 or storage 530 for instructions executing at processor 510 to operate on; the results of previous instructions executed at processor 510 for access by subsequent instructions executing at processor 510 or for writing to memory 520 or storage 530; or other suitable data. The data caches may speed up read or write operations by processor 510. The TLBs may speed up virtual-address translation for processor 510. In particular embodiments, processor 510 may include one or more internal registers for data, instructions, or addresses. This disclosure contemplates processor 510 including any suitable number of any suitable internal registers, where appropriate. Where appropriate, processor 510 may include one or more arithmetic logic units (ALUs); be a multi-core processor; or include one or more processors. Although this disclosure describes and illustrates a particular processor, this disclosure contemplates any suitable processor.

Memory 520 may include main memory for storing instructions for processor 510 to execute or data for processor 510 to operate on. As an example and not by way of limitation, computer system 500 may load instructions from storage 530 or another source (such as, for example, another computer system 500) to memory 520. Processor 510 may then load the instructions from memory 520 to an internal register or internal cache. To execute the instructions, processor 510 may retrieve the instructions from the internal register or internal cache and decode them. During or after execution of the instructions, processor 510 may write one or more results (which may be intermediate or final results) to the internal register or internal cache. Processor 510 may then write one or more of those results to memory 520. In particular embodiments, processor 510 executes only instructions in one or more internal registers or internal caches or in memory 520 (as opposed to storage 530 or elsewhere) and operates only on data in one or more internal registers or internal caches or in memory 520 (as opposed to storage 530 or elsewhere). One or more memory buses (which may each include an address bus and a data bus) may couple processor 510 to memory 520. Bus 560 may include one or more memory buses, as described below. In particular embodiments, one or more memory management units (MMUs) reside between processor 510 and memory 520 and facilitate accesses to memory 520 requested by processor 510. In particular embodiments, memory 520 includes random access memory (RAM). This RAM may be volatile memory. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 520 may include one or more memories 180, where appropriate. Although this disclosure describes and illustrates particular memory, this disclosure contemplates any suitable memory.

Storage 530 may include mass storage for data or instructions. As an example and not by way of limitation, storage 530 may include a hard disk drive (HDD), a floppy disk drive, flash memory, an optical disc, a magneto-optical disc, magnetic tape, or a Universal Serial Bus (USB) drive or a combination of two or more of these. Storage 530 may include removable or non-removable (or fixed) media, where appropriate. Storage 530 may be internal or external to computer system 500, where appropriate. In particular embodiments, storage 530 is non-volatile, solid-state memory. In particular embodiments, storage 530 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 530 taking any suitable physical form. Storage 530 may include one or more storage control units facilitating communication between processor 510 and storage 530, where appropriate. Where appropriate, storage 530 may include one or more storages 140. Although this disclosure describes and illustrates particular storage, this disclosure contemplates any suitable storage.

I/O interface 540 may include hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 185 for them. Where appropriate, I/O interface 540 may include one or more device or software drivers enabling processor 510 to drive one or more of these I/O devices. I/O interface 540 may include one or more I/O interfaces 185, where appropriate. Although this disclosure describes and illustrates a particular I/O interface, this disclosure contemplates any suitable I/O interface.

Communication interface 550 may include hardware, software, or both providing one or more interfaces for communication (such as, for example, packet-based communication) between computer system 500 and one or more other computer systems 500 or one or more networks (e.g., network 110). As an example and not by way of limitation, communication interface 550 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 550 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 550 for any of these networks, where appropriate. Communication interface 550 may include one or more communication interfaces 550, where appropriate. Although this disclosure describes and illustrates a particular communication interface, this disclosure contemplates any suitable communication interface.

Bus 560 may include hardware, software, or both coupling components of computer system 500 to each other. As an example and not by way of limitation, bus 560 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 560 may include one or more buses 560, where appropriate. Although this disclosure describes and illustrates a particular bus, this disclosure contemplates any suitable bus or interconnect.

The components of computer system 500 may be integrated or separated. In some embodiments, components of computer system 500 may each be housed within a single chassis. The operations of computer system 500 may be performed by more, fewer, or other components. Additionally, operations of computer system 500 may be performed using any suitable logic that may include software, hardware, other logic, or any suitable combination of the preceding.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An air flow channeling yaw control device comprising:
    a vane cover;
    a vane array comprising a plurality of vanes, wherein:
        each of the plurality of vanes comprises a first edge and a second edge, the first edge configured to be hingedly coupled to the vane cover and the second edge configured to be hingedly coupled to a wing of an aircraft; and
        at least one of the plurality of vanes comprises a gurney flap; and
    an actuator configured to move the plurality of vanes from a retracted position into a deployed position, wherein the plurality of vanes, when moved into the deployed position, are configured to direct a flow of air flowing over a leading edge of the wing through channels created by the plurality of vanes.

2. The air flow channeling yaw control device of claim 1, wherein the vane array is configured to retract into a cavity of the wing.

3. The air flow channeling yaw control device of claim 1, wherein the vane cover comprises a slot configured to accommodate the gurney flap.

4. The air flow channeling yaw control device of claim 1, wherein the gurney flap is positioned on a trailing edge of the at least one of the plurality of vanes.

5. The air flow channeling yaw control device of claim 1, wherein the plurality of vanes, when moved into the deployed position, do not reduce the ability of the aircraft to generate rolling moment control power.

6. The air flow channeling yaw control device of claim 1, wherein the plurality of vanes, when moved into the deployed position, do not reduce the ability of the aircraft to generate pitching moment control power.

7. The air flow channeling yaw control device of claim 1, wherein:
the actuator is communicably coupled to a controller; and
the actuator is configured to move the plurality of vanes based on instructions from the controller.

8. The air flow channeling yaw control device of claim 1, wherein a length of the vane cover is substantially equal to a summation of a height of each vane of the vane array.

9. The air flow channeling yaw control device of claim 1, wherein the plurality of vanes, when moved into the deployed position, extend from a bottom surface of the wing.

10. The air flow channeling yaw control device of claim 1, wherein the plurality of vanes, when moved into the deployed position, extend from a top surface of the wing.

11. The air flow channeling yaw control device of claim 1, wherein the vane cover, the plurality of vanes, or the gurney flap comprises a material selected from the group consisting of:
carbon fiber;
carbon nanotube;
cellulose nanocrystals;
kevlar;
plastic; and
metal.

12. A wing of an aircraft, the wing comprising:
an air flow channeling yaw control device; and
a cavity configured to accommodate the air flow channeling yaw control device;
wherein the air flow channeling yaw control device comprises:
a vane cover;
a vane array comprising a plurality of vanes, each of the plurality of vanes comprising a first edge and a second edge, the first edge being hingedly coupled to the vane cover and the second edge being hingedly coupled to a portion of the cavity; and
an actuator configured to move the plurality of vanes from a retracted position into a deployed position, wherein the plurality of vanes, when moved into the deployed position, are configured to direct a flow of air flowing over a leading edge of the wing through channels created by the plurality of vanes.

13. The wing of claim 12, wherein the air flow channeling yaw control device is configured to retract into the cavity when the plurality of vanes are moved into the retracted position.

14. The wing of claim 12, wherein at least one of the plurality of vanes comprises a gurney flap.

15. The wing of claim 14, wherein the vane cover comprises a slot configured to accommodate the gurney flap.

16. The wing of claim 12, wherein the air flow channeling yaw control device does not reduce the ability of the aircraft to generate rolling moment control power.

17. The wing of claim 12, wherein the air flow channeling yaw control device does not reduce the ability of the aircraft to generate pitching moment control power.

18. The wing of claim 12, wherein a length of the vane cover is substantially equal to a summation of a height of each vane of the vane array.

19. The wing of claim 12, wherein the plurality of vanes, when moved into the deployed position, extend from a bottom surface of the wing.

20. The wing of claim 12, wherein the plurality of vanes, when moved into the deployed position, extend from a top surface of the wing.

* * * * *